(12) United States Patent
Kim

(10) Patent No.: US 6,292,652 B1
(45) Date of Patent: Sep. 18, 2001

(54) REPEATER HAVING FREQUENCY CONVERSION

(75) Inventor: Jong-Ok Kim, Seoul (KR)

(73) Assignee: Shinsegi Telecomm, Inc., Seoul (KR)

( * ) Notice: Subject to any disclaimer, the term of this patent is extended or adjusted under 35 U.S.C. 154(b) by 0 days.

(21) Appl. No.: 09/243,924

(22) Filed: Feb. 3, 1999

(30) Foreign Application Priority Data

Nov. 25, 1998 (KR) .................................................. 98-50604

(51) Int. Cl.[7] .......................................................... H04B 7/14
(52) U.S. Cl. ................................................. 455/20; 455/14
(58) Field of Search .............................. 455/11.1, 14–16, 455/18, 20, 7, 22

(56) References Cited

U.S. PATENT DOCUMENTS 3,750,173 * 7/1973 Tackman ................................. 342/169
5,886,647 * 3/1999 Badger et al. ......................... 455/38.2

* cited by examiner

Primary Examiner—Vivian Chang
Assistant Examiner—Eliseo Ramos-Feliciano
(74) Attorney, Agent, or Firm—George E. Haas; Quarles & Brady LLP

(57) ABSTRACT

A carrier changing apparatus in a mobile telecommunication system for generating a dummy frequency assignment signal for repeating a frequency conversion or providing a hard hand off based on a traffic signal is provided. In the carrier changing apparatus, a transmitting carrier changer transmits an input forward traffic signal having traffic and overhead information and generates a forward dummy frequency assignment signal based on the forward traffic signal. A receiving carrier changer receives and outputs a reverse traffic signal having traffic and overhead information from a mobile station and generates a delayed reverse traffic signal based on a reverse dummy frequency assignment signal from the mobile station. Since the carrier changing apparatus generates a dummy frequency assignment signal for repeating a frequency conversion or providing a hard hand off by using a traffic signal, it can repeat a frequency conversion and provide a hard hand off without using an additional dummy frequency assignment signal device. Therefore, efficiency of the carrier changing apparatus can lower the cost of equipment.

6 Claims, 6 Drawing Sheets

REPEATER HAVING FREQUENCY CONVERSION

BACKGROUND OF THE INVENTION

1. Field of the Invention

The present invention relates to a mobile telecommunication system, more particularly, to a repeater having frequency conversion in a mobile telecommunication system for generating a dummy frequency assignment signal for repeating a frequency conversion or providing a hard handoff based on a traffic signal having traffic and overhead information.

2. Prior Art

In a code division multiple access(CDMA) mobile telecommunication system, a repeater is used to embody a smooth communication environment and to enlarge coverage thereof. Since the cost of such a repeater is relatively small according to equipment investment and management and is easily installed, it is widely used to enlarge coverage in a wave shadow area such as a mountainous district or a large size building, in a weak wave area such as a subway, or in an area in which service is provided.

A typical repeater amplifies and transmits a weak signal generated by a mother base station. Since a repeating frequency between a base station and a repeater is identical with a service frequency, an oscillating phenomenon is generated in the repeater. Therefore, in order to prevent the oscillating phenomenon, an isolation device should be provided. However, up to now, since service has been performed in a low gain of the repeater, it is limited to enlargement of coverage.

Currently, in order to improve any limitation according to enlargement of coverage, a frequency converting repeater is being widely used. Such a frequency converting repeater receives a dummy frequency assignment signal transmitted from a mother base station and converts it into a traffic signal of the mother base station. Thus, the frequency converting repeater provides service to a wave shadow area or a weak wave area by means of the traffic signal so that an oscillating phenomenon which is generated in a conventional repeater can be prevented.

U.S. Pat. No. 3,750,173 (issued to Norbert E. Tackman on Jul. 13, 1973) discloses a frequency translating repeater using single-sideband techniques.

FIG. 1 shows a conventional frequency converting apparatus in a base station.

The conventional frequency converting apparatus includes a traffic frequency device S1, a dummy frequency assignment device S2, a linear power amplifier(LPA) 122, and a low noise amplifier(LNA) 128.

The traffic frequency device S1 includes a first channel card 102, a first analog conversion unit(ACU) 104, and a first baseband combiner and radio(BCR) 106. The first channel card 102 generates a digital traffic signal of a baseband having traffic information and overhead information. The overhead information includes pilot channel information, paging channel information, and sync channel information.

The first ACU 104 converts the digital traffic signal of a baseband from the first channel card 102 into an analog signal. The first BCR 106 converts the analog traffic signal of a baseband from the first ACU 104 into an intermediate frequency traffic signal and converts the intermediate frequency traffic signal into a forward traffic signal F1.

The dummy frequency assignment device S2 includes a second channel card 112, a second ACU 114, and a second BCR 116. The second channel card 112 generates a digital dummy frequency assignment signal of a baseband having overhead information. The second ACU 114 converts the digital dummy frequency assignment signal of a baseband from the second channel card 112 into an analog signal. The second BCR 116 converts the analog dummy frequency assignment signal of a baseband from the second ACU 114 into an intermediate frequency signal and converts the intermediate frequency signal into a forward dummy frequency assignment signal F2. The LPA 122 amplifies the forward traffic and dummy frequency assignment signals F1 and F2 from the first and second BCR 106 and 116, respectively, and transmits them through an antenna 124. Accordingly, both the traffic signal F1 and dummy frequency assignment signal F2 from the LPA 122 are transmitted through a first antenna 122 to thereby perform a hard handoff between frequency assignments of base stations. The LNA 128 low-noise amplifies reverse traffic and dummy frequency assignment signals F1 and F2 transmitted through an antenna 126 and outputs them to the first and second BCRs 106 and 116.

However, in the conventional frequency converter in a base station, in order to provide a dummy frequency assignment signal which has the same information as that of traffic frequency signal and has a frequency different from that of the traffic frequency signal, a channel card, an analog conversion unit, and a baseband combiner and radio for providing the dummy frequency assignment signal should be added. Accordingly, that requires additional expenses.

SUMMARY OF THE INVENTION

Therefore, it is an object of the present invention, for the purpose of solving the above mentioned problems, to provide a carrier changing apparatus capable of generating a dummy frequency assignment signal for repeating frequency conversion or providing a hard hand off based on a traffic signal.

In order to attain the object, according to the present invention, there is provided a carrier changing apparatus, said apparatus comprising:

- a transmitting carrier changer for transmitting an input forward traffic signal having traffic and overhead information and generating a forward dummy frequency assignment signal based on the forward traffic signal; and
- a receiving carrier changer for receiving and outputting a reverse traffic signal having traffic and overhead information from a mobile station and generating a delayed reverse traffic signal based on a reverse dummy frequency assignment signal from the mobile station.

Preferably, the transmitting carrier changer includes a first directional coupler for dividing the input forward traffic signal into two paths to generate first and second divided forward traffic signals; and a transmitting carrier changing section for changing the second divided forward traffic signal from the first directional coupler into the forward dummy frequency assignment signal. More preferably, the receiving carrier changer includes a second directional coupler for dividing the reverse traffic and dummy frequency assignment signals from the mobile station into two paths; and a receiving carrier changing section for changing the reverse dummy frequency assignment signal from the second directional coupler into the delayed reverse traffic signal.

Also, there is provided a carrier changing apparatus, said apparatus comprising:

a directional coupler for dividing an input traffic signal having traffic and overhead information into two paths to generate first and second divided traffic signals; and a carrier changing section for changing the second divided traffic signal from the first directional coupler into a dummy frequency assignment signal.

Preferably, the directional coupler includes an input port for receiving the input forward traffic signal; a first coupled port connected to an input terminal of the carrier changing section; a first termination port mounted spaced from the first coupled port by a first predetermined distance; a second coupled port connected to an output terminal of the transmitting carrier changing section; a second termination port mounted spaced from the second coupled port by a second predetermined distance; and an output port for outputting the traffic signal received by the input port and the dummy frequency assignment signal from the transmitting carrier changing section.

More preferably, the carrier changing section includes a first band pass filter for band pass filtering the traffic signal of a radio frequency from the directional coupler at a first predetermined bandwidth; a first amplifier for amplifying an output signal of the first band pass filter; an intermediate frequency module for converting an output signal of the first amplifier into an intermediate frequency signal; a first surface acoustic wave filter for surface-acoustic wave filtering the intermediate frequency signal from the intermediate frequency module; a gain control section for controlling a gain of an output signal of the first surface acoustic wave filter according to a gain of the input traffic signal; a second surface acoustic wave filter for surface-acoustic wave filtering an output signal of the gain control section; a frequency converting section for converting an output signal of the surface acoustic wave filter into the dummy frequency assignment signal; a second band pass filter for band pass filtering the dummy frequency assignment signal from the frequency converting section at a second predetermined bandwidth; and a second amplifier for amplifying an output signal of the second band pass filter.

Since the present invention generates a dummy frequency assignment signal for a repeating carrier or a hard handoff by using a traffic signal by means of a carrier changer, it can repeat a frequency conversion and provide a hard hand off without using an additional dummy frequency assignment signal device. Therefore, efficiency of the present invention can lower the price.

Other objects and further features of the present invention will become apparent from the detailed description when read in conjunction with the attached drawings.

BRIEF DESCRIPTION OF THE DRAWINGS

Other features and advantages of the present invention will become more apparent from the following description taken in connection with the accompanying drawings, wherein.

DETAILED DESCRIPTION OF THE PREFERRED EMBODIMENT

The preferred embodiment of the present invention will hereinafter be described in detail with reference to the accompanying drawings.

Figure 1:
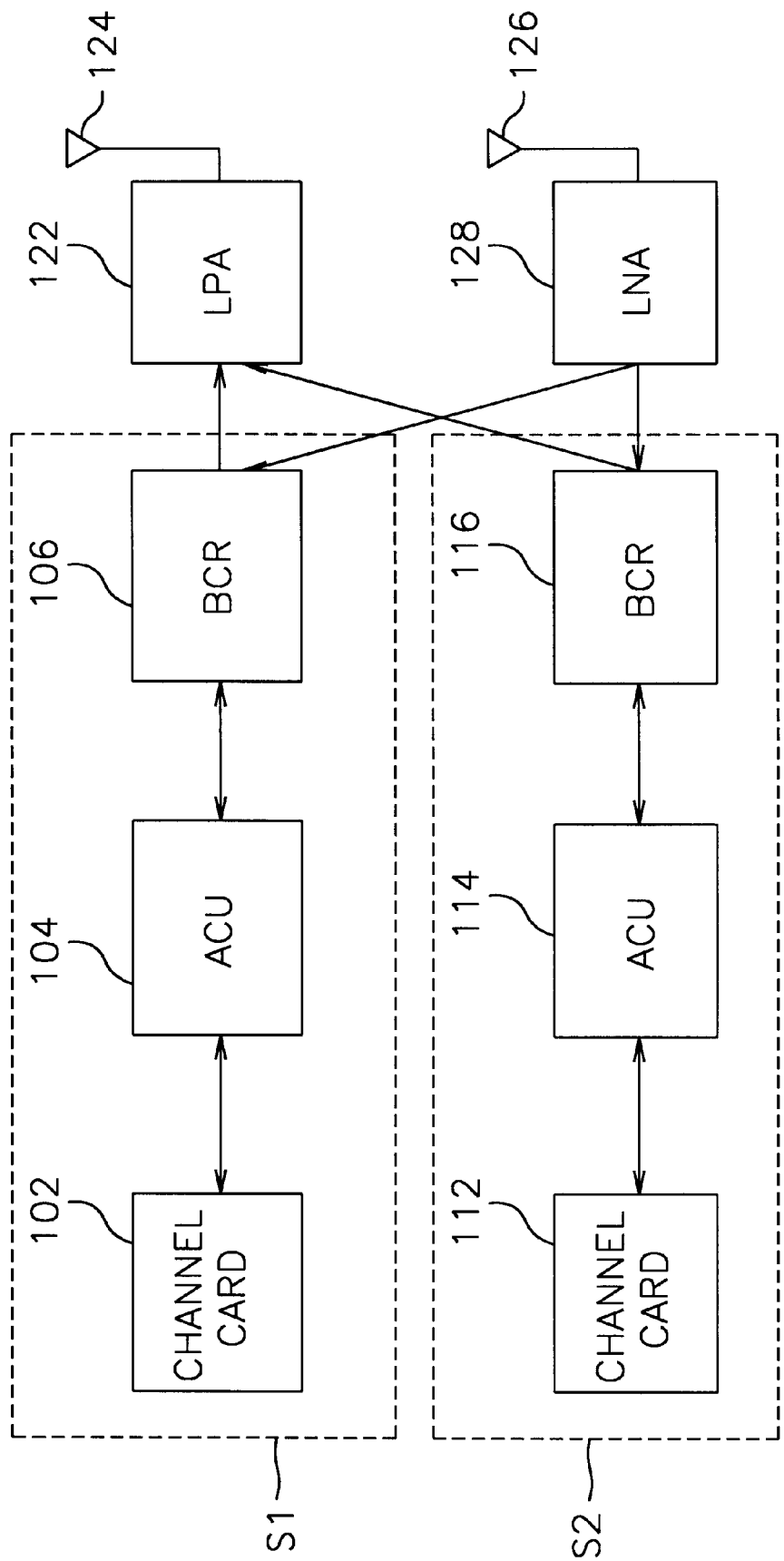
FIG. 1 is a block diagram for showing a configuration of a conventional frequency converter in a base station.
Figure 2:
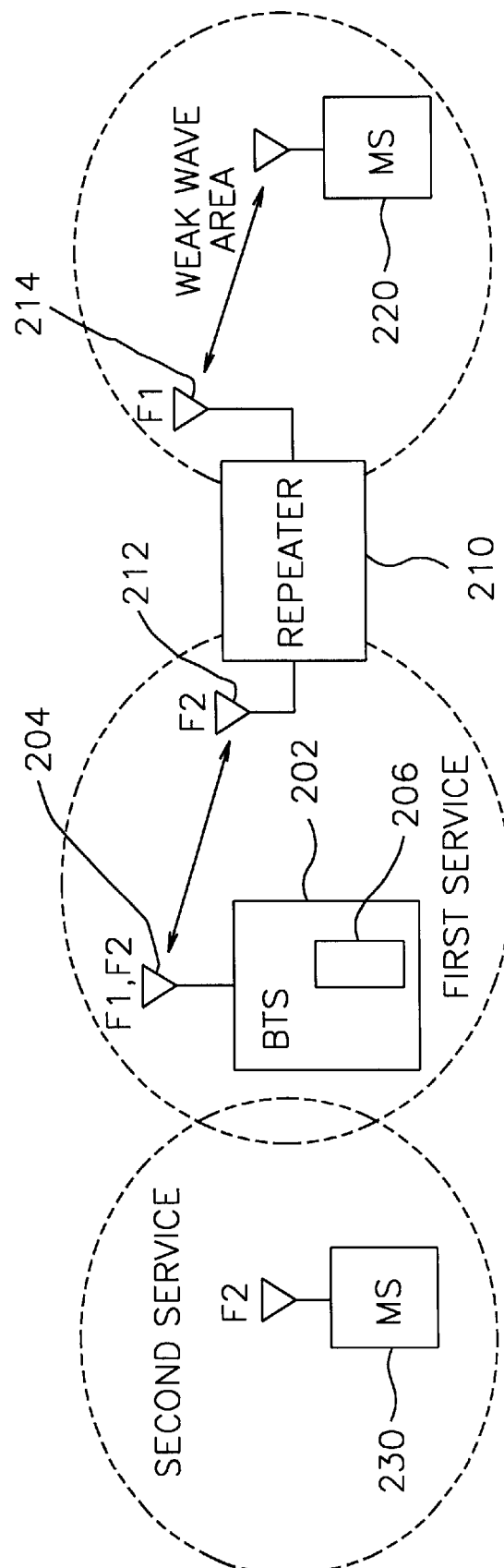
FIG. 2 is a view for illustrating a frequency conversion repeating method and a hard hand off method according to a first embodiment of the present invention.

FIG. 2 illustrates a frequency conversion repeating method and a hard hand off method according to a first embodiment of the present invention.

A base station 202 generates a traffic signal F1 and transmits the traffic signal F1 through an antenna 204. The base station 202 transmits a dummy frequency assignment signal F2 generated by a frequency converter 206 therein through the antenna 204. Information of the dummy frequency assignment signal F2 is the same as that of the traffic signal F1, but a frequency band of the dummy frequency assignment F2 is different from that of the traffic signal F1. The dummy frequency assignment signal F2 is a repeating carrier signal which repeats a mobile station 220 in a wave shadow area. The dummy frequency assignment signal F2 can also provide a hard hand off between frequency assignment. The dummy frequency assignment is not used as a traffic signal but is used as a non-traffic signal by transmitting information of a base station.

A frequency converting repeater 210 receives the dummy frequency assignment signal F2 from the base station 202 through a donor antenna 212, converts the received dummy frequency assignment signal F2 into a traffic signal F1, and transmits the traffic signal F1 through a coverage antenna 214.

Consequently, a mobile station 220 which is located in a wave shadow area or a weak wave area links with the base station 202 through the frequency converting repeater 210 to thereby perform a smooth communication.

When a mobile station 230 which is located in a second service area moves to a first service area, the mobile station 230 monitors a traffic signal F2 and sends the monitoring information to the base station 202. The base station 202 sends traffic information to the mobile station 230 in response to the monitoring information from the mobile station 230 and generates a dummy frequency assignment signal F2 in the first service area based on a traffic signal F1. Accordingly, a mobile station 230 in the second area links with the base station 202 by using the dummy frequency assignment signal F2 to thereby perform a smooth communication.

Figure 3:
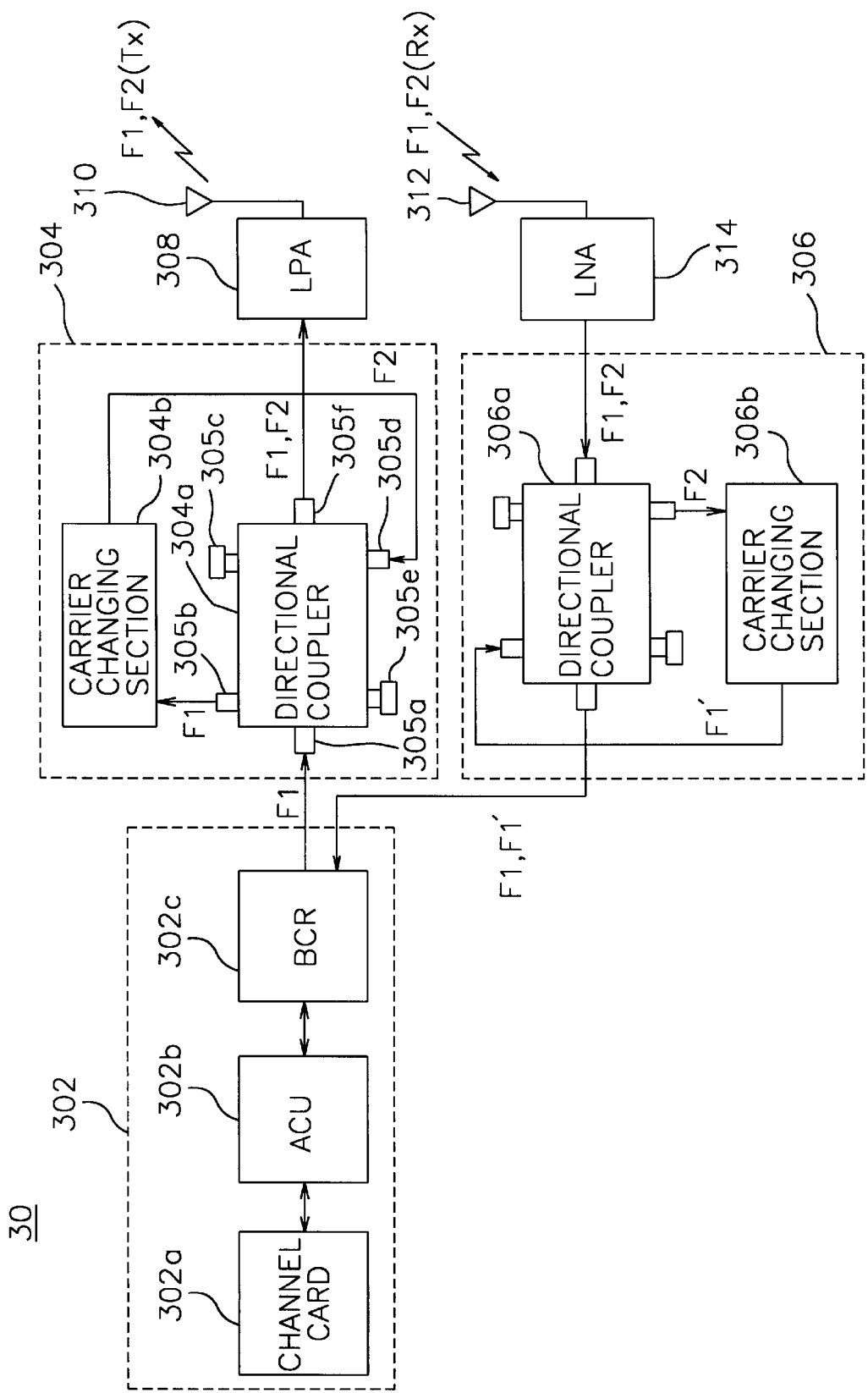
FIG. 3 is a block diagram for showing a configuration of a repeater having frequency conversion according to a first embodiment of the present invention.

FIG. 3 is a block diagram for showing a configuration of a repeater having frequency conversion 30 according to a first embodiment of the present invention. The repeater having frequency conversion 30 includes a traffic signal generator 302, a transmitting carrier changer 304, and a receiving carrier changer 306, a lineal power amplifier (LPA) 308. and a low noise amplifier 314.

The traffic signal generator 302 generates a forward traffic signal F1 having traffic and overhead information. Preferably, in an embodiment of the present invention, the forward traffic signal F1 has 884.58 MHz frequency.

The traffic signal generator 302 includes a channel card 302a, an analog conversion unit(ACU) 302b, and a baseband combiner and radio(BCR) 302c.

The channel card 302a generates a digital traffic signal of a baseband. The ACU 302b converts the digital traffic signal of a baseband from the channel card 302a into an analog signal. The BCR 302c converts the analog traffic signal of a baseband from the ACU 302b into an intermediate frequency traffic signal. The BCR 302c converts the intermediate frequency traffic signal into a radio frequency forward traffic signal F1.

The transmitting carrier changer 304 receives and transmits the forward traffic signal F1 having traffic and overhead information from the traffic signal generator 302. The transmitting carrier changer 304 generates a forward dummy frequency assignment signal F2 based on the forward traffic signal F1. The forward dummy frequency assignment signal repeats a frequency conversion and provides a hard hand off between frequency assignments of base stations. Preferably, in an embodiment of the present invention, the forward dummy frequency assignment signal F2 has 887.04 MHz frequency.

The transmitting carrier changer 304 includes a first directional coupler 304a and a transmitting carrier changing section 304b. The first directional coupler 304a divides the forward traffic signal F1 from the traffic signal generator 302 into two paths to generate first and second forward divided traffic signals. The first directional coupler 304a includes an input port 305a, a first coupled port 305b, a first termination port 305c, a second coupled port 305d, a second termination port 305e, and an output port 305f. The input port 305a is connected to an output terminal of the traffic signal generator 302 and receives the forward traffic signal F1 from the traffic signal generator 302. The first coupled port 305b is connected to an input terminal of the transmitting carrier changing section 304b. The first termination port 305c is mounted spaced from the first coupled port 305b by a first predetermined distance. The second coupled port 305d is connected to an output terminal of the transmitting carrier changing section 304b. The second termination port 305e is mounted spaced from the second coupled port 305d by a first predetermined distance. The output port 305f outputs the forward traffic signal F1 received by the input port 305a and the forward dummy frequency assignment signal F2 from the transmitting carrier changing section 304b.

Figure 4:
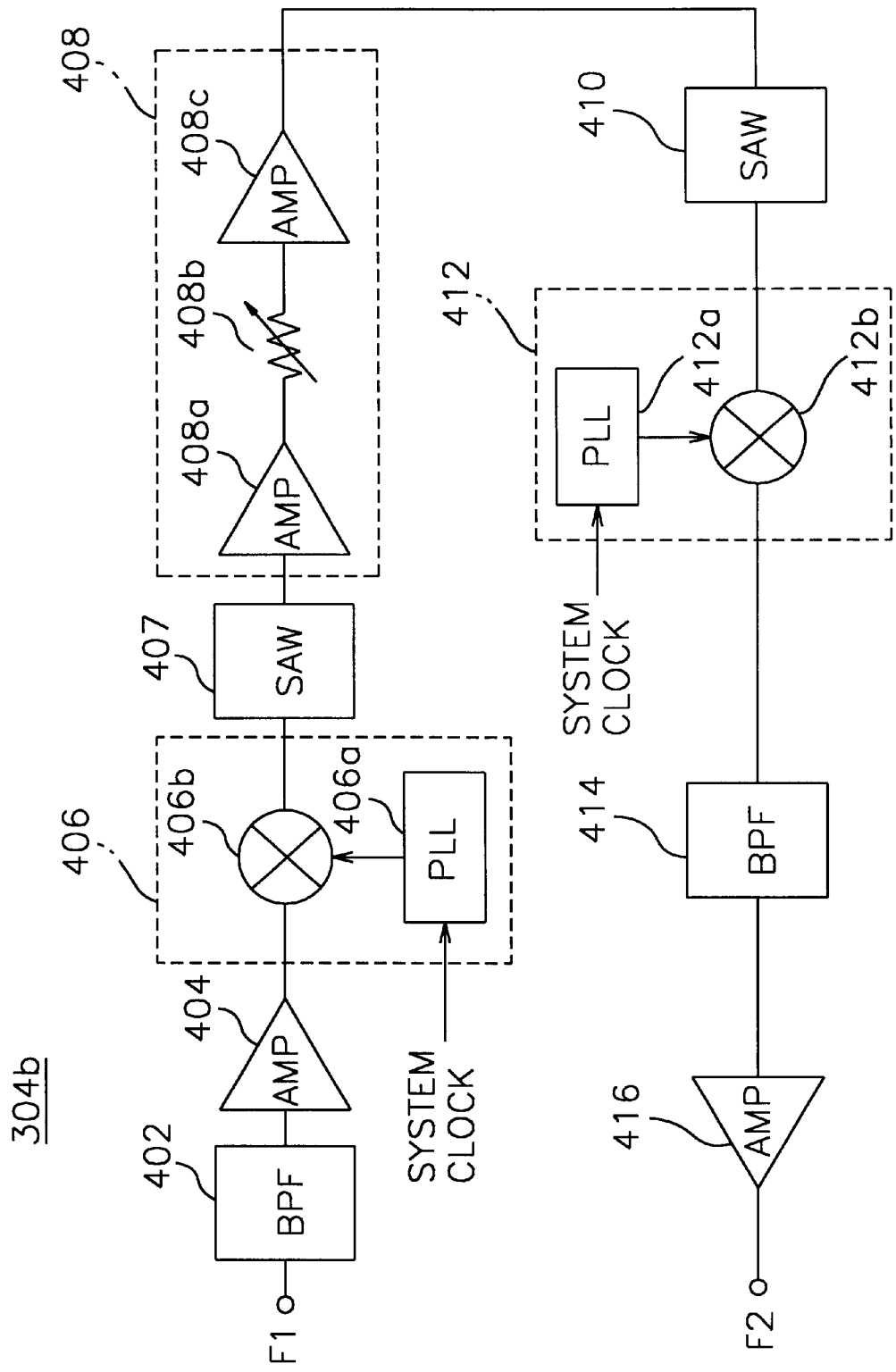
FIG. 4 is a block diagram for showing one example of a transmitting carrier changing section shown in FIG. 3.

FIG. 4 shows one example of a transmitting carrier changing section 304b shown in FIG. 3. The transmitting carrier changing section 304b changes the forward traffic signal F1 from the first directional coupler 304a into the forward dummy frequency assignment signal F2. The transmitting carrier changing section 304b includes a first band pass filter(BPF) 402, a first amplifier 404, an intermediate frequency(IF) module 406, a first surface acoustic wave (SAW) filter 407, a gain control section 408, a second surface acoustic wave(SAW) filter 410, a frequency converting section 412, a second BPF 414, and a second amplifier 416.

The first BPF 402 band-pass filters the traffic signal of a radio frequency from the first directional coupler 304a at a first predetermined bandwidth. The first amplifier 404 amplifies an output signal of the first BPF 402.

The IF module 406 converts an output signal of the first amplifier 404 into an intermediate frequency(IF) signal. The IF module 406 includes a first phase-locked loop(PLL) 406a and a first mixer 406b. The first PLL 406a generates a first oscillating signal based on a system clock from a GPS (global positioning system) receiver(not shown). The first mixer 406b mixes the output signal of the first amplifier 404 and the first oscillating signal from the first PLL 406a in order to generate the intermediate frequency signal. The first surface acoustic wave(SAW) filter 407 surface-acoustic wave filters the intermediate frequency signal from the IF module 406.

The gain control section 408 controls a gain of an output signal of the first SAW filter 407 according to a gain of the traffic signal F1. The gain control section 408 includes a third amplifier 408a, an attenuator 408b, and a fourth amplifier 408c. The third amplifier 408a amplifies the IF signal from the IF module 406. The attenuator 408b attenuates a gain of an output signal of the third amplifier according to a gain of the traffic signal F1. The fourth amplifier 408c amplifies an output signal of the attenuator 408b. The SAW filter 410 surface-acoustic wave filters an output signal of the gain control section 408. The frequency converting section 412 converts an output signal of the second SAW filter 410 into the dummy frequency assignment signal F2. The frequency converting section 412 includes a second phase-locked loop(PLL) 412a and a second mixer 406b. The second PLL 412a generates a second oscillating signal based on a system clock from a GPS(global positioning system) receiver(not shown). The second mixer 412b mixes the output signal of the second SAW filter 410 and the second oscillating signal from the second PLL 412a in order to generate the dummy frequency assignment signal F2. The second BPF 414 band-pass filters the dummy frequency assignment signal F2 from the frequency converting section 412 at a second predetermined bandwidth. The second amplifier 416 amplifies an output signal of the second BPF 414.

The LPA 308 amplifies the forward traffic and dummy frequency assignment signals F1 and F2 from the first carrier changer 304 and transmits them through an antenna 310. The LNA 314 low-noise amplifies reverse traffic and dummy frequency assignment signals F1 and F2 from a mobile station.

The receiving carrier changer 306 outputs the reverse traffic signal F1 received by the LNA 310 to the traffic signal generator 302. Preferably, in an embodiment of the present invention, the reverse traffic signal F1 has 839.58 MHz frequency.

The receiving carrier changer 306 generates a delayed reverse traffic signal F1' based on the reverse dummy frequency assignment signal F2 received by the LNA 310. The reverse dummy frequency assignment signal F2 provides a hard hand off between frequency assignments of base stations Preferably, in an embodiment of the present invention, the reverse dummy frequency assignment signal F2 has 842.04 MHz frequency.

An operation of the carrier changing apparatus 30 according to a preferred embodiment of the present invention will be described with reference to the accompanying drawings.

The channel card 302a of the traffic signal generator 302 generates a digital traffic signal of a baseband. The digital traffic signal of a baseband generated by the channel card 302a is provided to the ACU 302b. The ACU 302b converts the digital traffic signal of a baseband from the channel card 302a into an analog signal. The analog traffic signal of a baseband from the ACU 302b is provided to the BCR 302c. The BCR 302c converts the analog traffic signal of a baseband from the ACC 302b into an intermediate frequency traffic signal and converts the intermediate frequency traffic signal into the forward traffic signal F1. The forward traffic signal F1 from the BCR 302c is provided to the first carrier changer 304.

The transmitting carrier changer 304 receives and transmits the forward traffic signal F1 from the traffic signal generator 302. The first carrier changer 304 generates a forward dummy frequency assignment signal F2 based on the forward traffic signal F1. That is, the first directional coupler 304a of first carrier changer 304 divides the forward traffic signal from the traffic signal generator 302 into two paths to generate first and second forward divided traffic signals. The transmitting carrier changing section 304b changes the second forward divided traffic signal from the first directional coupler 304a into the forward dummy frequency assignment signal F2.

As shown in FIG. 4, the first BPF 402 of the transmitting carrier changing section 304b band-pass filters the traffic signal of a radio frequency from the first directional coupler 304a at a first predetermined bandwidth. The output signal of the first BPF 402 is provided to the first amplifier 404. The first amplifier 404 amplifies an output signal of the first BPF 402. The output signal of the first BPF 402 is provided to the IF module 406. The IF module 406 converts an output signal of the first amplifier 404 into an intermediate frequency(IF) signal. The IF signal from the IF module 406 is provided to the first SAW filter 407. The first SAW filter 407 surface-acoustic wave filters the intermediate frequency signal from the IF module 406.

The gain control section 408 controls a gain of an output signal of the first SAW filter 407 according to a gain of the traffic signal F1. The output signal of the gain control section 408 is fed to the second SAW filter 410. The second SAW filter 410 surface-acoustic wave filters an output signal of the gain control section 408. The output signal of the SAW filter 410 is fed to the frequency converting section 412. The frequency converting section 412 converts an output signal of the SAW filter 410 into the dummy frequency assignment signal F2. The second BPF 414 band-pass filters the dummy frequency assignment signal F2 from the frequency converting section 412 at a second predetermined bandwidth. The output signal of the second BPF 414 is fed to the second amplifier 416. The second amplifier 416 amplifies an output signal of the second BPF 414. The output signal of the second amplifier 416 is fed to the first directional coupler 304a.

The LPA 308 amplifies the forward traffic and dummy frequency assignment signals F1 and F2 from the transmitting carrier changer 304 and transmits them through an antenna 310. The LNA 314 low-noise amplifies reverse traffic and dummy frequency assignment signals F1 and F2 from a mobile station. The second carrier changer 306 receives and amplifies reverse traffic and dummy frequency assignment signals F1 and F2 low-noise amplified by the LNA 314, and outputs the reverse traffic signal F1 to the traffic signal generator 302. The receiving carrier changer 306 generates a delayed reverse traffic signal F1' based on the reverse dummy frequency assignment signal F2.

Figure 5:
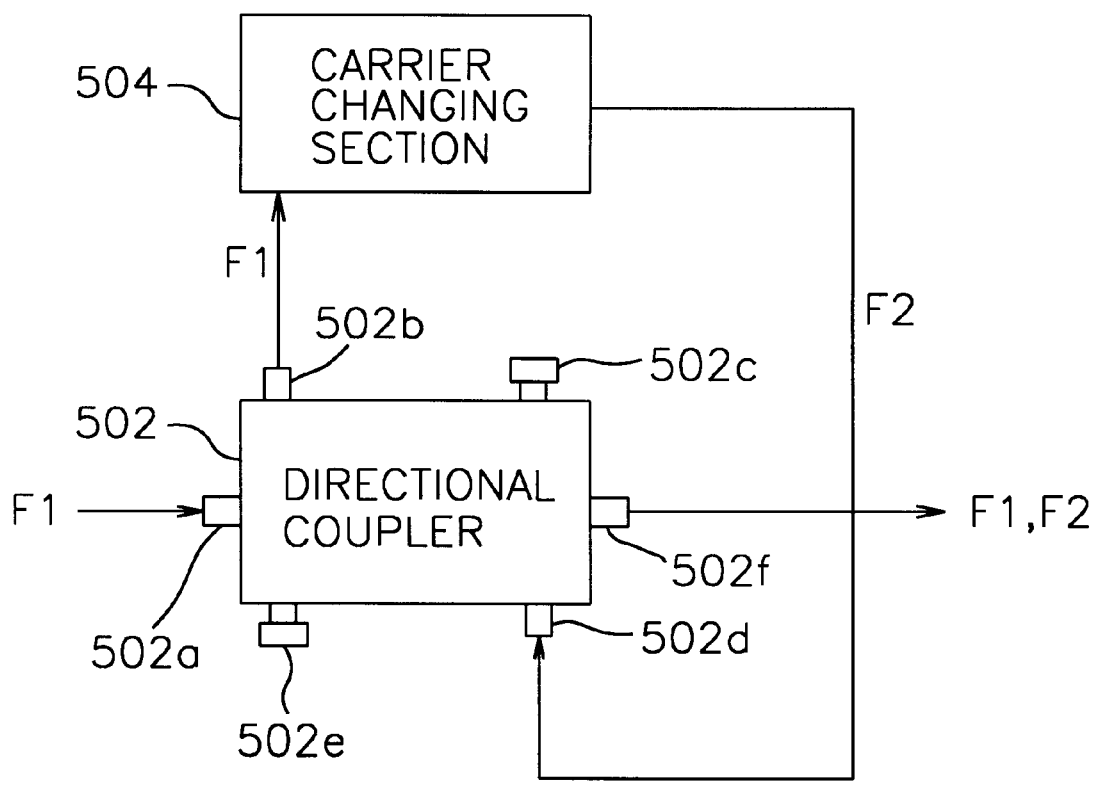
FIG. 5 is a block diagram for showing a configuration of a repeater having frequency conversion according to a second embodiment of the present invention.

FIG. 5 shows a configuration of a carrier changing apparatus 50 according to a second embodiment of the present invention.

The carrier changing apparatus includes a directional coupler 502 and a carrier changing section 504.

The directional coupler 502 divides a traffic signal F1 into two paths to generate first and second divided traffic signals. The directional coupler 502 includes an input port 502a, a first coupled port 502b, a first termination port 502c, a second coupled port 502d, a second termination port 502e, and an output port 502f. The input port 502a receives the input forward traffic signal F1. The first coupled port 305b is connected to an input terminal of the carrier changing section 504. The first termination port 502c is mounted spaced from the first coupled port 502b by a first predetermined distance. The second coupled port 502d is connected to an output terminal of the carrier changing section 504. The second termination port 502e is mounted spaced from the second coupled port 502d by a first predetermined distance. The output port 502f outputs the forward traffic signal F1 received by the input port 502a and a dummy frequency assignment signal F2 from the carrier changing section 304b.

Figure 6:
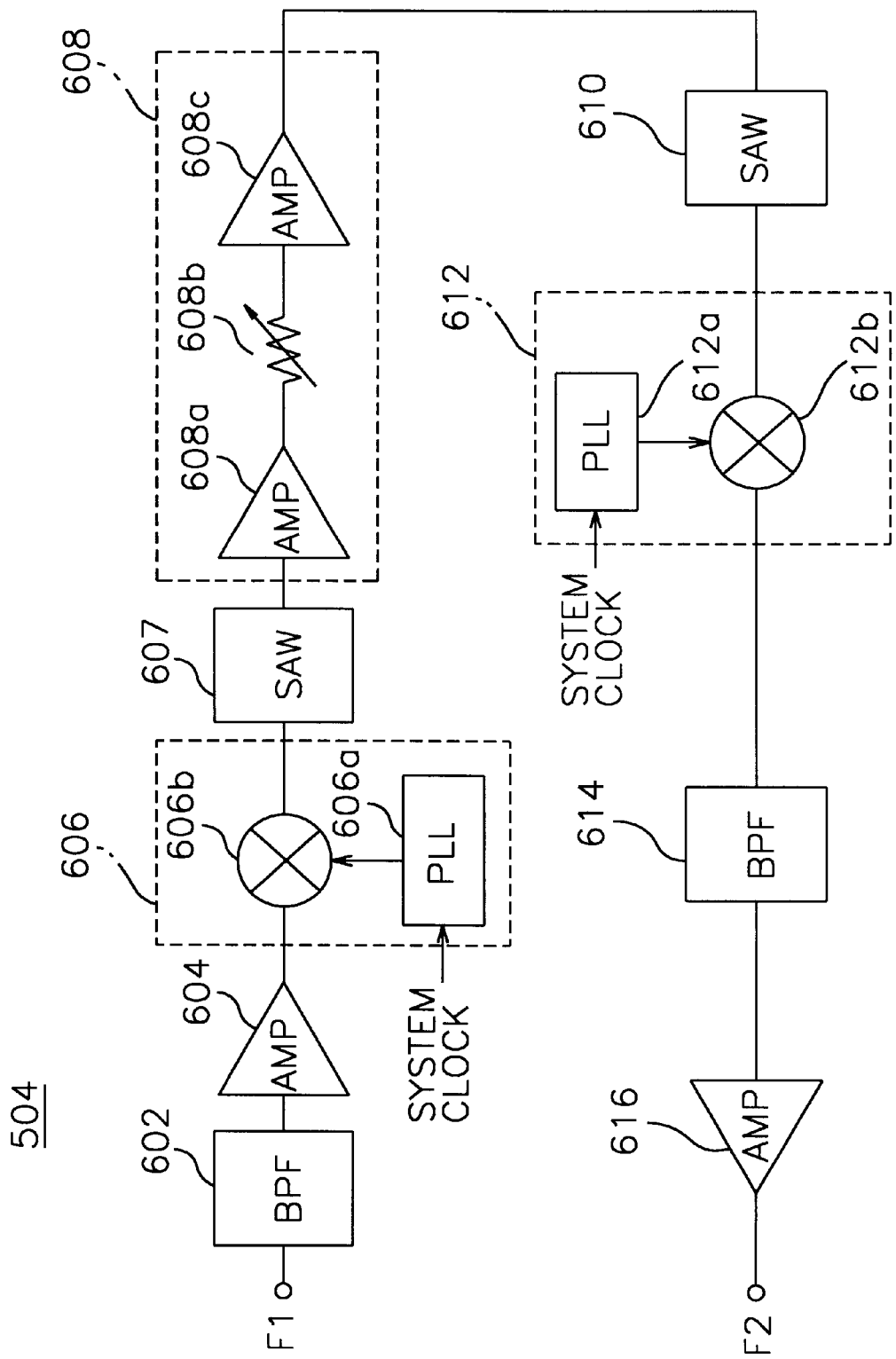
FIG. 6 is a block diagram for showing one example of a carrier changing section shown in FIG. 5.

FIG. 6 shows one example of a carrier changing section 504 shown in FIG. 5.

The carrier changing section 504 changes the traffic signal F1 from the directional coupler 502 into the dummy frequency assignment signal F2. The dummy frequency assignment signal F2 repeats a frequency conversion. The carrier changing section 504 includes a first band pass filter(BPF) 602, a first amplifier 604, an intermediate frequency(IF) module 606, a first surface acoustic wave(SAW) filter 607, a gain control section 608, a second surface acoustic wave (SAW) filter 610, a frequency converting section 612, a second BPF 614, and a second amplifier 616.

The first BPF 602 band-pass filters the traffic signal of a radio frequency from the directional coupler 503 at a first predetermined bandwidth. The first amplifier 604 amplifies an output signal of the first BPF 602.

The IF module 606 converts an output signal of the first amplifier 604 into an intermediate frequency(IF) signal. The IF module 606 includes a first phase-locked loop(PLL) 606a and a first mixer 606b. The first PLL 606a generates a first oscillating signal based on a system clock from a GPS (global positioning system) receiver(not shown). The first mixer 606b mixes the output signal of the first amplifier 604 and the first oscillating signal from the first PLL 606a in order to generate the intermediate frequency signal. The first surface acoustic wave(SAW) filter 607 surface-acoustic wave filters the intermediate frequency signal from the IF module 606.

The gain control section 608 controls a gain of an output signal of the first SAW filter 607 according to a gain of the traffic signal F1. The gain control section 608 includes a third amplifier 608a, an attenuator 608b, and a fourth amplifier 608c. The third amplifier 608a amplifies the IF signal from the IF module 606. The attenuator 608b attenuates a gain of an output signal of the third amplifier according to a gain of the traffic signal F1. The fourth amplifier 408c amplifies an output signal of the attenuator 608b. The SAW filter 610 surface-acoustic wave filters an output signal of the gain control section 608. The frequency converting section 412 converts an output signal of the second SAW filter 610 into the dummy frequency assignment signal F2. The frequency converting section 612 includes a second phase-locked loop(PLL) 612a and a second mixer 612b. The second PLL 612a generates a second oscillating signal based on a system clock from a GPS(global positioning system) receiver(not shown). The second mixer 612b mixes the output signal of the second SAW filter 410 and the second oscillating signal from the second PLL 612a in order to generate the dummy frequency assignment signal F2.

The second BPF 614 band-pass filters the dummy frequency assignment signal F2 from the frequency converting section 612 at a second predetermined bandwidth. The second amplifier 616 amplifies an output signal of the second BPF 614.

As mentioned above, since the present invention generates a dummy frequency assignment signal for repeating a frequency conversion or providing a hard hand off by using a traffic signal, it can repeat a frequency conversion and provide a hard hand off without using an additional dummy frequency assignment signal device. That is, the carrier changing apparatus according to the present invention can transmits and receives a dummy frequency assignment signal without additional equipment such as a channel, an analog common card, a baseband combiner and radio that a conventional frequency converter needs. Accordingly, the present invention can lower the cost of equipment. Since the size of the carrier changing apparatus is quite small, equipment installation and realignment are very easy. Signal loss and noise generation are reduced when transmitting and receiving a frequency signal so that traffic range of a frequency converting repeater becomes wide and success is achieved for a hard hand off between base stations more than 99%.

The invention may be embodied in other specific forms without departing from the spirit or essential characteristics thereof. The present embodiments are therefore to be considered in all respects as illustrative and not restrictive, the scope of the invention being indicated by the appended claims rather than by the foregoing description and all changes which come within the meaning and range of equivalency of the claims are therefore intended to be embraced therein.

What is claimed is:

1. A repeater having frequency conversion, said repeater comprising:
   a transmitting carrier changer for transmitting an input forward traffic signal having traffic and overhead information and generating a forward dummy frequency assignment signal based on the forward traffic signal, the transmitting carrier changer includes a first directional coupler for dividing the input forward traffic signal into two paths to generate first and second divided forward traffic signal, and a transmitting carrier changer section for changing the second divided forward traffic signal from the first directional coupler into the forward dummy frequency assignment signal, and the first directional coupler includes an input port for receiving the input forward traffic signal a first coupled port connected to an input terminal of the transmitting carrier changing section, a first termination port mounted spaced from the first coupled port by a first predetermined distance, a second coupled port connected to an output terminal of the transmitting carrier changing section, a second termination port mounted spaced from the second coupled port by a second predetermined distance, and an output port for outputting the forward traffic signal received by the input port and the forward dummy frequency assignment signal from the transmitting carrier changing section; and
   a receiving carrier changer for receiving and outputting a reverse signal having traffic and overhead information from a mobile station and generating a delayed reverse traffic signal based on a reverse dummy frequency assignment signal from the mobile station.

2. The repeater having frequency conversion as defined in claim 1, wherein the forward dummy frequency assignment signal repeats a frequency conversion and provides a hard hand off between frequency assignments of base stations, and the reverse dummy frequency assignment signal provides a hard hand off between frequency assignments of base stations.

3. The repeater having frequency conversion as defined in claim 1, wherein the transmitting carrier changing section includes
   a first band pass filter for band pass filtering the traffic signal of a radio frequency from the first directional coupler at a first predetermined bandwidth;
   a first amplifier for amplifying an output signal of the first band pass filter;
   an intermediate frequency module for converting an output signal of the first amplifier into an intermediate frequency signal;
   a first surface acoustic wave filter for surface-acoustic wave filtering the intermediate frequency signal from the intermediate frequency module;
   a gain control section for controlling a gain of an output signal of the first surface acoustic wave filter according to a gain of the input traffic signal;
   a second surface acoustic wave filter for surface-acoustic wave filtering all output signal of the gain control section;
   frequency converting section for converting an output signal of the surface acoustic wave filter into the dummy frequency assignment signal;
   a second band pass filter for band pass filtering the dummy frequency assignment signal from the frequency converting section at a second predetermined bandwidth; and
   a second amplifier for amplifying an output signal of the second band pass filter.

4. The repeater having frequency conversion as defined in claim 3, wherein the intermediate frequency module includes
   a first phase-locked loop for generating a first oscillating signal based on a system clock; and
   a first mixer for mixing the output signal of the first amplifier and the first oscillating signal from the first phase-locked loop in order to generate the intermediate frequency signal.

5. The repeater having frequency conversion as defined in claim 3, wherein the gain control section includes
   a third amplifier for amplifying the intermediate frequency signal from the intermediate frequency module:
   an attenuator for attenuating a gain of an output signal of the third amplifier according to a gain of the traffic signal; and
   a fourth amplifier for amplifying an output signal of the attenuator.

6. The repeater having frequency conversion as defined in claim 1, wherein the receiving carrier changer includes:
   a second directional coupler for dividing the reverse traffic and dummy frequency assignment signals from the mobile station into two paths; and
   a receiving carrier changing section for changing the reverse dummy frequency assignment signal from the second directional coupler into the delayed reverse traffic signal.

* * * * *